United States Patent
Nigam

(10) Patent No.: US 9,665,357 B2
(45) Date of Patent: May 30, 2017

(54) METHOD AND APPARATUS FOR SYNCHRONIZING APPLICATION CONFIGURATION DATA OVER A NETWORK

(71) Applicant: Adobe Systems Incorporated, San Jose, CA (US)

(72) Inventor: Ashutosh Nigam, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/196,605

(22) Filed: Mar. 4, 2014

(65) Prior Publication Data

US 2015/0254067 A1 Sep. 10, 2015

(51) Int. Cl.
*G06F 9/445* (2006.01)
*H04L 12/24* (2006.01)
*G06F 9/44* (2006.01)

(52) U.S. Cl.
CPC .............. *G06F 8/61* (2013.01); *H04L 41/082* (2013.01); *H04L 41/0843* (2013.01); *G06F 8/60* (2013.01); *G06F 8/71* (2013.01)

(58) Field of Classification Search
CPC .......... G06F 8/61; G06F 8/60; G06F 11/2058; G06F 11/2074; G06F 11/2076; G06F 11/1433; G06F 15/177; G06F 8/71; H04L 41/0853; H04L 41/082; H04L 41/08; H04L 29/0854; H04L 67/34; H04L 67/1095; H04W 4/003; H04N 1/00933
See application file for complete search history.

(56) References Cited

U.S. PATENT DOCUMENTS

| | | | |
|---|---|---|---|
| 2004/0128370 A1* | 7/2004 | Kortright | H04L 41/082 709/221 |
| 2005/0245249 A1* | 11/2005 | Wierman et al. | 455/419 |
| 2006/0031456 A1* | 2/2006 | Della | 709/224 |

(Continued)

FOREIGN PATENT DOCUMENTS

CN   EP 2775675 A4 * 11/2014 ......... H04L 41/0672

OTHER PUBLICATIONS

Appendix A—Replicating, Distributing, and Synchronizing Data, Microsoft, Jun. 4, 2012, retrieved online on Dec. 29, 2016. Retrieved from the Internet: <URL: https://msdn.microsoft.com/en-us/library/hh868047.aspx>.*

(Continued)

*Primary Examiner* — Thuy Dao
*Assistant Examiner* — Hanh T Bui
(74) *Attorney, Agent, or Firm* — Keller Jolley Preece

(57) ABSTRACT

An apparatus and computer implemented method for synchronizing application configuration data over a network comprising storing, electronically, application configuration data for an application installed on a first device; providing for selection by a second device, one or more application configuration data packages based on the stored application configuration data; receiving, from the second device, a selection of one of the one or more application configuration data packages; generating an installation package that is based on the selected application configuration package; and providing the installation package to the second device for installation.

18 Claims, 3 Drawing Sheets

(56) References Cited

U.S. PATENT DOCUMENTS

| | | | |
|---|---|---|---|
| 2009/0204699 A1* | 8/2009 | Kortright | H04L 41/082 709/223 |
| 2010/0023605 A1* | 1/2010 | Li | G06F 15/177 709/221 |
| 2012/0030325 A1* | 2/2012 | Silverman | H04M 1/72527 709/222 |
| 2013/0013998 A1* | 1/2013 | Eykholt | G06F 8/73 715/229 |

OTHER PUBLICATIONS

Jeffrey Bickford and Ramon Caceres, Towards Synchronization of Live Virtual Machines among Mobile Devices, ACM, 2013, retrieved online on Dec. 29, 2012, pp. 1-6. Retrieved from the Internet:<URL: http://delivery.acm.org/10.1145/2450000/2444794/a13-bickford.pdf?>.*

* cited by examiner

METHOD AND APPARATUS FOR SYNCHRONIZING APPLICATION CONFIGURATION DATA OVER A NETWORK

BACKGROUND

Field

Embodiments of the present invention generally relate to application installation and, more particularly, to a method and apparatus to synchronize application configuration data over a network.

Description of the Related Art

Currently, there are limited options for configuring the installation of software applications. A user may wish to install an application on, for example, a new laptop using a same configuration that is installed on, for example, the user's desktop computer. When a user wishes to install an application on an electronic device, the user is limited to either installing a most recent version of the application available on the Internet, or installing a version of the application that the user has stored on a fixed medium such as a DVD or FLASH drive. In either instance, no personal application configurations that were performed by the user after installation can be restored upon a re-installation of the application on a same device or installation on the application on a new device. The user must manually install the initial application and then manually configure the newly installed application. The requirement for manual configuration provides a poor user experience. Therefore, there is a need for a method and apparatus synchronizing application configuration data over a network.

SUMMARY OF THE INVENTION

A method for synchronizing application configuration data over a network. The method comprises storing application configuration data on a server. The application configuration data describes the configuration of an application on a first device of a user. Upon request to synchronize an application on the first device with a second device of the user, the method provides for selection a plurality of application configuration data packages based on the stored application configuration data. Upon receipt of a selection of one of the application configuration data packages, the method generates an installation package based on the selection and provides the installation package for download to the second device.

In another embodiment, an apparatus for synchronizing application configuration data over a network is described. The apparatus includes a computer having one or more processors. A configuration module stores application configuration data for an application installed on a first device of a user. A synchronization module provides for selection a plurality of application configuration data packages based on the stored application configuration data. Upon receipt of a selection of one of the application configuration data packages, the synchronization module generates an installation package based on the selection and provides the installation package for download to the second device.

In yet another embodiment, a computer readable medium for synchronizing application configuration data is described. The computer readable medium stores computer instructions that, when executed by at least one processor causes the at least one processor to perform a method for synchronizing application configuration data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
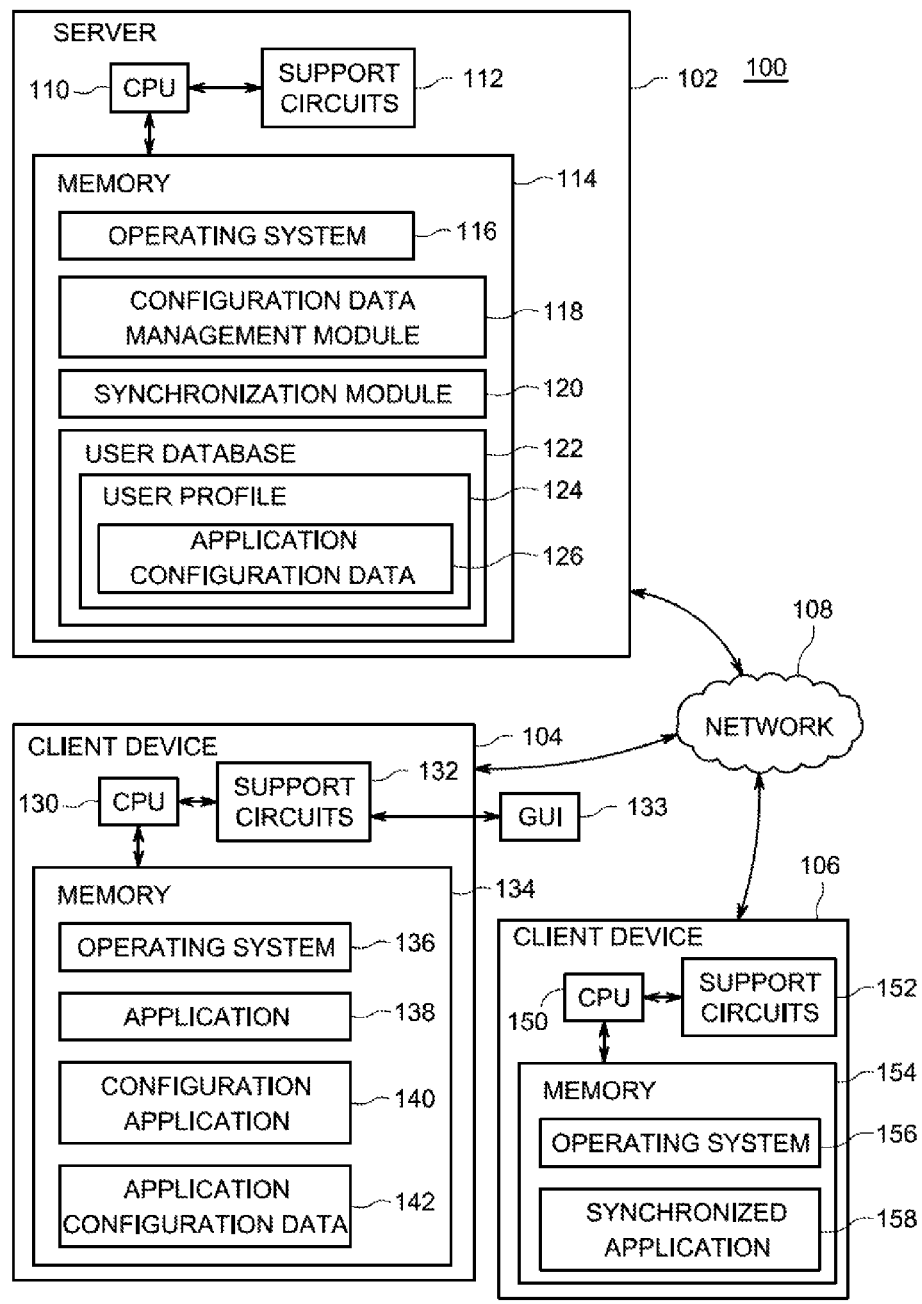
FIG. 1 is a block diagram of a system for synchronizing application configuration data over a network according one or more embodiments.

While the method and apparatus is described herein by way of example for several embodiments and illustrative drawings, those skilled in the art will recognize that the method is not limited to the embodiments or drawings described. It should be understood that the drawings and detailed description herein are not intended to limit embodiments to the particular form disclosed. Rather, the intention is to cover all modifications, equivalents and alternatives falling within the spirit and scope of the method and apparatus to synchronize application configurations over a network as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, existing solutions require manual selection of upgrades and extensions after installing a software application in order to have an application configuration on a second device similar to the application configuration on a first device.

Thus, and in accordance with an embodiment of the present invention, techniques are provided herein that allow for user-customized configuration data corresponding to an application configuration on a first device to be selected for installation on a second device. Software downloads to the first device are identified and stored on a configuration data server in an application configuration data file. The application configuration data file includes a listing of software applications that are installed on the first device. In addition, the application configuration data file includes any upgrades, extensions, and settings that are configured for each software application. As software application updates and extensions are installed on the first device, the application configuration data file on the configuration data server is updated, thereby maintaining an up-to-date application configuration data file for the software application installed on the first device. The application configuration data file is maintained for the software applications installed on a first device of a user.

The user logs into the configuration data server with a second device. The embodiments display the one or more configurations that are identified in the application configuration data file. Each of the one or more configurations in the application configuration data file may selected for installation on the second device. Upon selection, a configured software application is packaged as an application configuration data package. The user may select a configuration that the user would like to have installed on the second device or opt to perform a clean install of the software application on the second device. Upon selection of a configuration of a software application, the embodiments generate an installation package to match the software and settings as identified in the application configuration data file. The installation package is then provided to the second device for download and installation.

In one example, the user has PHOTOSHOP version 14.2 installed on the user's first device. The user wants to work with the exact same version of PHOTOSHOP to be installed on his second device that he has installed on his first device. In order to install the PHOTOSHOP version 14.2 on his second device, the user simply logs into the configuration data server from the second device, selects the PHOTOSHOP configuration that exists on the user's first device and has the identical PHOTOSHOP version 14.2 configuration installed on the user's second device.

Embodiments of the present invention include a method and an apparatus to synchronize application configurations over a network. An application configuration includes a software application with user-selected plug-ins, extensions, and the like installed to work with the software application. A user logs into a configuration data server from a first device. The user downloads a software application with various extensions and settings. The server stores the software application title, version, extensions, date, settings, and the like as application configuration data in a user profile. As additional upgrades, extensions, and the like are downloaded to the first device, the application configuration data file is updated to reflect a most current configuration of the software application on the first device. In addition, as upgrades, extensions, and the like are installed on the first device, for example from a CD or other offline medium, the application configuration data is sent to the server to update the application configuration data file on the server, for the first device.

A user may then login to the configuration data server from a second device. The second device may be the same device as the first device or a different device from the first device. For example, if the first device is a laptop and the laptop crashes (that is, has a major software malfunction), the application on the laptop may need to be restored to the application configuration that existed on the laptop prior to the crash. In such case, the first device is the same device as the second device. Alternatively, the first device may be a user's desktop computer and the second device may be the user's laptop, in which case, the first device is different from the second device.

A list of application configurations of one or more applications that the user has installed on the user's other devices is provided for display to the second device. For example, the user has PHOTOSHOP version 13.0.4 with one or more extensions installed on the user's first device and also has INDESIGN with one or more extensions installed on the user's first device. Application configuration data exists in the user profile for each of the applications. The list of application configurations that are provided for display to the second device includes PHOTOSHOP 13.0.4, plus extensions as configured on the user's first device, INDESIGN, plus extensions as configured on the user's first device, and also includes an option to do a clean (uncustomized) configuration of a latest version of PHOTOSHOP and a clean configuration of a latest version of INDESIGN.

Upon receipt of a selection of the configuration that the user would like to have installed on the second device, the server generates an installation package for an installation of the application on a second device. The installation package is then provided for download and installation to the second device.

As used herein, application configuration data refers to settings, parameters, customized variables, installed plug-ins, version updates, dates modified, and the like made to a particular application program by a user. The application configuration data does not include settings or parameters for synchronizing a file opened by a software application, such as a Portable Document Format (PDF) file, a WORD document, or an image file. As such, PDFs, WORD documents and image files are not synchronized from a first device to a second device. A network referred herein may include cloud network architecture such as that found in CREATIVE CLOUD™. In one embodiment, synchronization refers to packaging a configured software application that is installed on a first device and providing the same configuration of the software application across multiple electronic devices and/or virtual machines. The electronic devices may be of a same manufacturer, or a different manufacturer or operating system. In another embodiment, synchronization refers to a re-installation of an application on a same electronic device and/or virtual machine.

Advantageously, the methods described herein allow changes made to an application on a user device to be incorporated into an installation file to be used for a later installation. In the event that a user's computer crashes, the computer may be restored to factory setting. However, upon logging into the configuration data server, the previously installed configuration of software may be easily reinstalled. In the event that a user purchases a new computing device and wants the same custom configuration of a software product on the new computing device that the user has on an existing device, the custom configuration may be selected from the configuration files on the configuration data server and installed in the new computer. Thus, the migration of an application from one device to another becomes a seamless transition. The present invention improves user experience by providing accurate and convenient application migration and synchronization.

Various embodiments of a method to synchronize application data across a network are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for synchronizing application configuration data 126 over a network 108 according one or more embodiments. Operation of the system 100 is described with respect to FIGS. 2, 3, 4, 5, 6A, 6B, and 6C. The system 100 includes a server 102, a first client device 104, and a second client device 106, communicatively connected via a network 108. The server 102 may be a configuration data server. The server 102 is an electronic or a computing device, for providing computing services in the cloud. Examples of the server 102 include, but are not limited to a blade server, a virtual server, and the like. In one embodiment, server 102 is a cloud repository, such as ADOBE® Document Cloud and ADOBE® Creative Cloud™. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system (OS) 116, a configuration data management module 118, a synchronization module 120 and a user database 122. The user database 122 includes a plurality of user profiles, collectively referred to as user profile 124. Each user profile 124 includes application configuration data 126.

The first client device 104 and second client device 106 are a type of computing device, such as a desktop computer, a laptop, a tablet computer, a Smartphone, and the like. In some embodiments, the second client device 106 comprises a re-configuration of the first client device 104, such as a re-configuration to factory default settings.

The first client device 104 includes a Central Processing Unit (CPU) 130, support circuits 132, a graphical user interface (GUI) 133, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system (OS) 136 and a software application 138, hereinafter referred to as application 138, a configuration application 140, and application configuration data 142. The OS 136 may include various commercially known operating systems. The application 140 may be any software application including, but are not limited to, ADOBE ACROBAT®, ADOBE PHOTOSHOP®, ADOBE ELEMENTS® and the like.

The second client device 106 includes a CPU 150, support circuits 152, and memory 154. The memory 154 includes an operating system (OS) 156 and a synchronized application 158.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

A user logs into a server 102 from the client device 104. The user downloads and installs application 138 with various extensions and settings. The server 102 stores the software application title, version, extensions, date, settings, and the like as application configuration data 126 in a user profile 124. As additional upgrades, extensions, and the like are downloaded and installed on client device 104, configuration data management module 118 updates the application configuration data 126 to reflect a most current configuration of the application 138 on the client device 104. In addition, as upgrades, extensions, and the like are installed on the client device 104, for example from a CD or other offline medium, the configuration application 140 updates the application configuration data 142 and sends the updated application configuration data 142 to the configuration data management module 118 to update the application configuration data 126. Hence, application configuration data 126 exists for each application installed on the client device 104.

A user may then log into the configuration data server 102 from a second client device 106. The server 102 determines whether the client device 106 is a new device (i.e., a device that is not listed as a registered device in the user profile 124.) If the client device 106 is determined to be a new device, the synchronization module 120 accesses the application configuration data 126 for the user and provides for display a list of application configurations of one or more applications that the user has installed on the user's other devices. For example, the user may have PHOTOSHOP version 13.0.4 with one or more extension and INDESIGN with one or more extensions installed on the user's desktop computer (i.e., client device 104). The list of application configurations that the synchronization module 120 provides for display to the client device 106 includes PHOTOSHOP 13.0.4, plus extensions as configured on the client device 104, INDESIGN, plus extensions as configured on client device 104, and also includes an option to do a clean (un-customized) configuration of the latest version of PHOTOSHOP and a clean configuration of the latest version of IN DESIGN.

Upon receipt of a selection of the configuration that the user would like to have installed on client device 106, the synchronization module 120 determines whether the selected custom configuration is compatible with the client device 106. For example, the selection may be a request to install PHOTOSHOP 14.2 with all add-ons and extensions as installed on client device 104 with an operating system 136 of Windows 7. If the OS 156 of the client device 106 is the same as in the application configuration data 126, the synchronization module 120 generates an installation package for an installation of the application on client device 106 that is identical to the installation on the user's Windows 7 OS device. However, if the client device 106 has an OS 156 that is different from the OS 136 on the client device 104, the synchronization module 120 determines if there is a comparable version of the custom configuration for the OS 156. For example, if the OS 156 is a MAC OS, and the selected custom configuration that includes PHOTOSHOP 14.2 is for a Windows 7 operating system, the synchronization module 120 generates an installation package identical to the custom configuration but with versions that run on a MAC OS. If, however, the synchronization module 120 determines that there is no compatible version of software for the OS 156 that matches the selected custom configuration, for example if the OS 156 is an ANDROID OS and PHOTOSHOP 14.2 is unsupported on the ANDROID OS. In such case, the synchronization module 120 displays a message to the user, and if available, generates an installation package for installation of the application on the client device 106 using a last compatible version of the software, for example, PHOTOSHOP 14.0 for the ANDROID OS. The installation package includes the same or compatible software version, upgrades, extensions, setting, and the like as the application 138 on client device 104. Upon request from the client device 106 to the server 102, the installation package may be downloaded to the client device 106 for installation, at which time the synchronization module 120 provides the installation package for download and installation to client device 106 as synchronized application 158.

Figure 2:
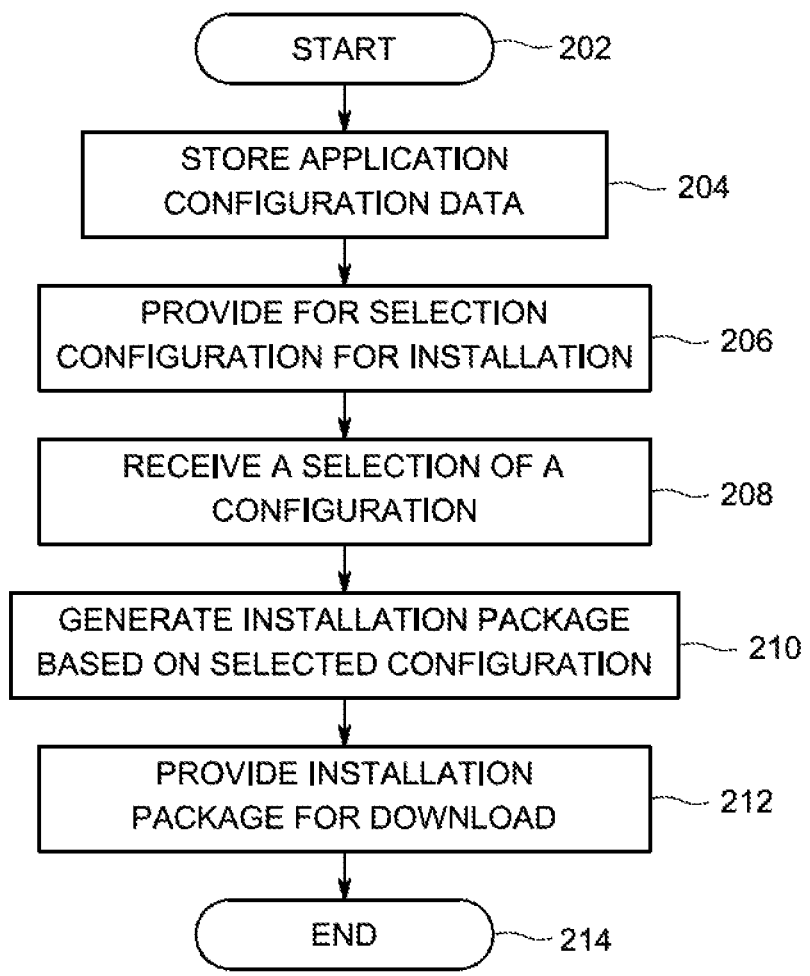
FIG. 2 depicts a flow diagram of a method for synchronizing application configuration data amongst computer devices over a network, as performed the synchronization module of FIG. 1, according to one or more embodiments.

FIG. 2 depicts a flow diagram of a method 200 for synchronizing application configuration data amongst computer devices over a network, as performed the synchronization module 120 of FIG. 1, according to one or more embodiments. The method 200 stores application configuration data for an application installed on a first client device. The method 200 then, upon request generates an installation package for download to a second client device where the installation package incorporates the application configuration data. Upon a request from the second client device, the method 200 provides for download to the second client device, the generated installation package. The method 200 starts at step 202 and proceeds to step 204.

At step 204, the method 200 stores application configuration data. The method 200 receives a request for a software application. The request is sent from a user on a first device. The user logs into a server from which the software application may be downloaded and installed. The method 200 stores information regarding the software application on the server as application configuration data. Exemplary application configuration data may be stored as follows:

<userID: userID@test.com; productID: Ps; OS: Win OS, Windows 7; Date: 9 Oct 18:33; config: Photoshop 14.2, CameraRaw 8.2; extensions: matlab 1.0, typeDNA 3.0>

The sample application configuration data identifies PHOTOSHOP version 14.2 installed on a computing device with Windows 7 having CameraRaw version 8.2 also installed in addition to PHOTOSHOP extensions Matlab 1.0 and TypeDNA 3.0. The application configuration data was last updated on 9 Oct at 18:330.

As additional software updates and extensions are downloaded and installed onto the first client device, the method 200 updates the application configuration data to reflect the latest configuration of the application as it is installed on the first device. Optionally, the method 200 may receive additional updates from the first device if, for example additional updates and/or extensions are installed on the first device offline. The user may also uninstall, for example Matlab 1.0 from the first client device. The method 200 receives the updated configuration of the application from the first device and subsequently updates the application configuration data with the latest configuration and timestamps the application configuration data with a date and time of the last update.

The method 200 proceeds to step 206, where the method 200 provides a plurality of configuration options that may be selected for installation. The method 200 receives a request from a second client device. A user on the second client device logs into the configuration data server and requests to install a software application. The method 200 accesses the application configuration data associated with the user login. The method 200 generates a list of configuration options for installation based on the application configuration data. Using the present example, the method 200 generates a list of PHOTOSHOP 14.2 with CameraRaw 8.2 and extensions Matlab 1.0 and TypeDNA 3.0. The method 200 also includes in the list, an option to select a generic "clean" installation of ADOBE PHOTOSHOP, which is an un-customized version of PHOTOSHOP.

The method 200 proceeds to step 208, where the method 200 receives a selection of a configuration from the list of configuration options. The method 200 proceeds to step 210, where the method 200 generates an installation package based on the selected configuration. The method 200 determines whether the operating system (OS) of the second client device is identical to the OS specified in the selected configuration. In the present example, the selected configuration is for a WINDOWS 7 OS. If the OS of the second client device is also WINDOWS 7, then the method 200 generates the installation package to include the identical software as specified in the application configuration data, specifically, PHOTOSHOP 14.2 with CameraRaw 8.2 and extensions Matlab 1.0 and TypeDNA 3.0.

However, if the method 200 determines that the OS of the second client device is different from the OS specified in the selected configuration, the method 200 determines whether there are comparable versions of the software in the selected configuration for the OS of the second client device. For example, if the OS of the second client device is a MAC OS, the method 200 determines if there exists PHOTOSHOP 14.2 with CameraRaw 8.2 and extensions Matlab 1.0 and TypeDNA 3.0 for the MAC OS. If so, the method 200 generates an installation package that includes the MAC OS versions of the selected configuration.

If the method 200 determines that the OS of the second client device is different from the OS specified in the selected configuration and there are not comparable versions of the software in the selected configuration for the OS of the second client device, the method 200 displays a message to inform the user. The method 200 then generates an installation package that includes the software application in the last compatible version. For example, if the OS of the second client device is an ANDROID OS, and the last compatible version of PHOTOSHOP for the ANDROID OS is an ANDROID OS version of PHOTOSHOP 14.0, the method 200 generates an installation package that includes the ANDROID OS version of PHOTOSHOP 14.0.

The method 200 proceeds to step 212, where the method 200 provides the installation package for download and installation to the second client device. Hence, a user who has a software application configured on a first user device in such a way as to meet the user's needs, need not manually create a same configuration of a software application on a new device. Rather, the configuration may simply be selected and an installation package based on the application configuration data for the software application on the first device is generated for installation on a second device. The installation package for the second device includes exactly the same configuration of the software application with same updates, extensions, plug-ins as the software application installed on the first device. The method 200 proceeds to step 214 and ends.

Figure 3:
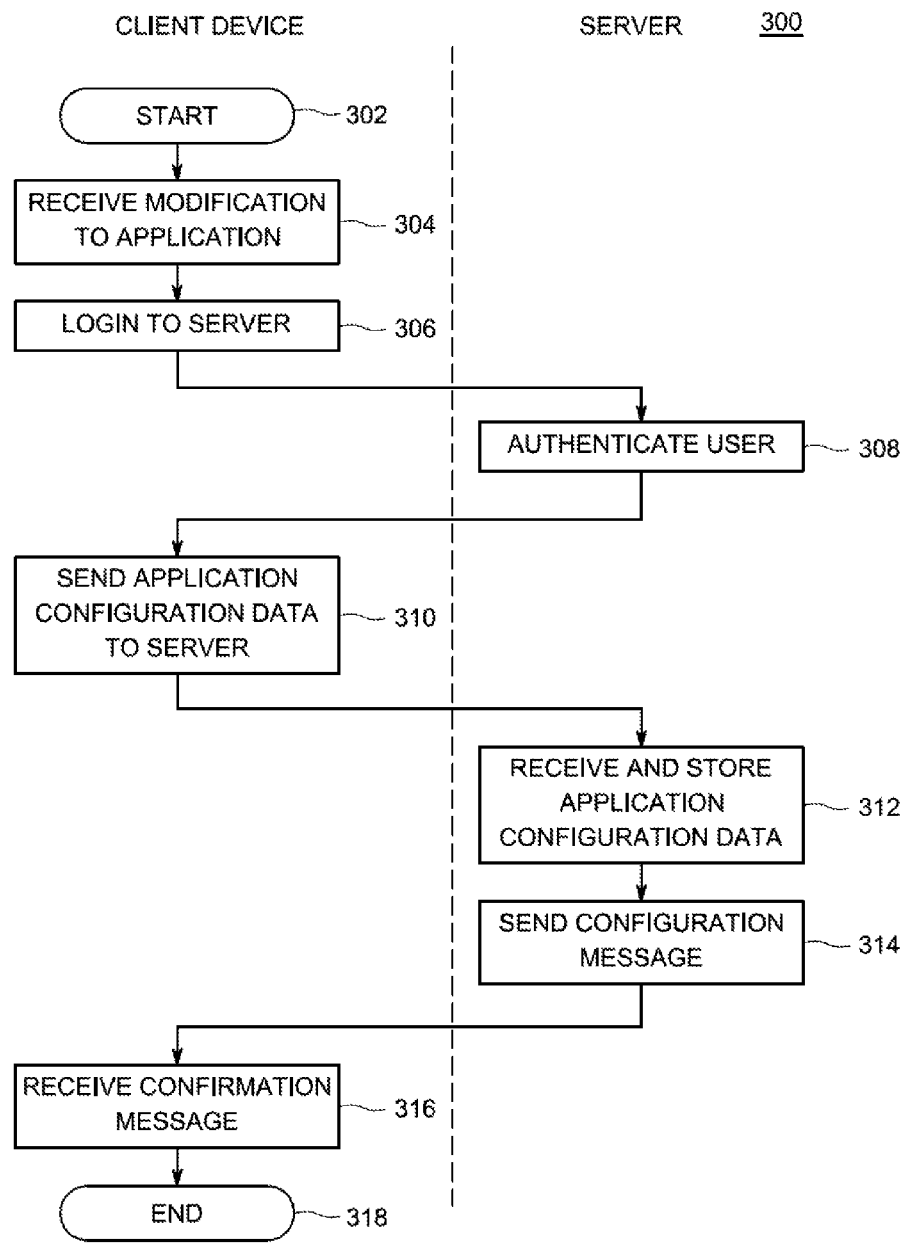
FIG. 3 depicts a flow diagram of a method for updating application configuration data on a server when updates are made to an application on a client device, as performed by the configuration application and configuration data management module of FIG. 1, according to one or more embodiments of the invention.

FIG. 3 depicts a flow diagram of a method 300 for updating application configuration data on a server when updates are made to an application on a client device, as performed by the configuration application 140 and configuration data management module 118 of FIG. 1, according to one or more embodiments of the invention. The method 300 starts at step 302 and proceeds to step 302.

At step 304, the method 300 receives a modification to the configuration of a software application. The modification may be an update to the software application, a deletion of one or more extensions to the software application, and the like. For example, the software application may be configured as a clean installation of PHOTOSHOP. A user installs, for example a MATLAB® extension into ADOBE® PHOTOSHOP®. The installation modifies the configuration of the software application which must then be reflected on the server. This ensures the server maintains an accurate, up-to-date configuration of the application as stored in the application configuration data.

The method 300 proceeds to step 306, where the method 300 facilitates logging into the server. The method 300 proceeds to step 308, where the method 300 authenticates the user login. The method 300 proceeds to step 310, where the method 300 generates application configuration data for the modified software application and sends the application configuration data to the server.

The method 300 proceeds to step 312, where the application configuration data is received on the server and stored as application configuration data in a user profile associated with the user login.

The method 300 proceeds to step 314, where the method 300 facilitates sending a confirmation message to the client device confirming successful storage of the application configuration data. The method 300 proceeds to step 316, where the method 300 receives the confirmation message at which time the method 300 proceeds to step 318 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for synchronizing modified application configuration data across devices, comprising:
   detecting, by one or more servers, a customized application configuration for an application installed on a first device utilized by a user, the customized application configuration reflecting one or more selections by the user of the first device with regard to available configurations related to the application;
   generating, by the one or more servers, an application configuration data package comprising the customized application configuration reflecting the one or more selections by the user of the first device, the application configuration data package configured to cause installation of the application with the customized application configuration;
   in response to receiving, by the one or more servers, a request for the application from a second device associated with the user of the first device, providing, from the one or more servers, for display and selection by the second device associated with the user of the first device, the application configuration data package comprising the customized application configuration reflecting the one or more selections by the user of the first device; and
   based on receiving, by the one or more servers, a selection of the application configuration data package from the second device associated with the user of the first device, providing the application configuration data package to the second device from the one or more servers, such that upon installation of the application configuration data package by the second device the application will be installed on the second device with the customized application configuration of the application installed on the first device, wherein the application configuration data package causes installation of the application on the second device with a same configuration as the application installed on the first device.

2. The method of claim 1, further comprising:
   storing, on the one or more servers, application configuration data corresponding to the customized application configuration for the application installed on the first device;
   detecting, by the one or more servers, updates to the customized application configuration for the application installed on the first device, wherein the updates to the customized application configuration reflect one or more additional selections by the user of the first device;
   in response to the detected updates to the customized application configuration, updating, by the one or more servers, the application configuration data corresponding to the customized application configuration for the application on the first device; and
   generating the application configuration data package based on the updated application configuration data corresponding to the updated customized application configuration for the application on the first device.

3. The method of claim 1, further comprising:
   detecting a second customized application configuration for a second application installed on the first device associated with the user;
   generating a second application configuration data package comprising the second customized application configuration for the second application installed on the first device, wherein the second application configuration data package is configured to cause installation of the second application with the second customized application configuration; and
   in response to the request to the one or more servers for the application from the second device associated with the user of the first device, providing, from the one or more servers, for display and selection by the second device associated with the user of the first device, the application configuration data package corresponding to the application and the second application configuration data package corresponding to the second application.

4. The method of claim 1, wherein generating the application configuration data package comprises:
   determining that the second device associated with the user of the first device utilizes a second operating system different from a first operating system utilized by the first device; and
   configuring the application configuration data package to cause installation of the application with the customized application configuration on the second device with the second operating system.

5. The method of claim 1, wherein providing, for display and selection by the second device associated with the user of the first device, the application configuration data package comprising the customized application configuration further comprises:
   providing, for display and selection by the second device associated with the user of the first device, a plurality of application configuration data packages, wherein the plurality of application configuration data packages comprises at least one application configuration data package based on the customized application configuration and at least one application configuration data package not based on the application configuration data.

6. The method of claim 1, wherein generating the application configuration data package comprises:
   determining that the second device associated with the user of the first device utilizes a second operating system different from a first operating system utilized by the first device;
   determining that a portion of the customized application configuration is not compatible with the second operating system; and
   generating the application configuration data package comprising a last compatible version of the portion of the customized application configuration that is not compatible with the second operating system, wherein the last compatible version is compatible with the second operating system of the second device associated with the user.

7. A system comprising:
at least one server; and
at least one non-transitory computer readable storage medium storing instructions that, when executed by the at least one server, cause the system to:
detect a customized application configuration for an application installed on a first device utilized by a user, the customized application configuration reflecting one or more selections by the user of the first device with regard to available configurations related to the application;
generate an application configuration data package comprising the customized application configuration reflecting the one or more selections by the user of the first device, the application configuration data package configured to cause installation of the application with the customized application configuration;
in response to receiving, by the at least one server, a request for the application from a second device associated with the user of the first device, provide, from the at least one server, for display and selection by the second device associated with the user of the first device, the application configuration data package comprising the customized application configuration reflecting the one or more selections by the user of the first device; and
based on receiving, by the at least one server, a selection of the application configuration data package from the second device associated with the user of the first device, provide the application configuration data package to the second device from the at least one server, such that upon installation of the application configuration data by the second device the application will be installed on the second device with the customized application configuration of the application installed on the first device, wherein the application configuration data package causes installation of the application on the second device with a same configuration as the application installed on the first device.

8. The system of claim 7, further comprising instructions that, when executed by the at least one server, cause the system to:
store application configuration data corresponding to the customized application configuration for the application installed on the first device; and
update the application configuration data corresponding to the customized application configuration for the application on the first device when updates are made to the application on the first device.

9. The system of claim 8 further comprising instructions that, when executed by the at least one server, cause the system to:
detect access to the at least one server by the second device associated with the user of the first device, wherein the second device is not the first device; and
in response to detecting access to the at least one server by the second device associated with the user of the first device, automatically provide from the at least one server, for display and selection by the second device associated with the user of the first device, the application configuration data package comprising the customized application configuration.

10. The system of claim 7, further comprising instructions that, when executed by the at least one server, cause the system to:
detect a second customized application configuration for a second application installed on the first device associated with the user;
generate a second application configuration data package comprising the second customized application configuration for the second application installed on the first device; and
in response to the request to the at least one server for the application from the second device associated with the user of the first device, provide, from the at least one server, for display and selection by the second device associated with the user of the first device, the application configuration data package corresponding to the application and the second application configuration data package corresponding to the second application.

11. The system of claim 7, wherein the instructions, when executed by the at least one server, cause the system to generate the application configuration data package by:
determining that a portion of the customized application configuration is not compatible with the second device associated with the user; and
generating the application configuration data package comprising a last compatible version of the portion of the customized application configuration that is not compatible with the second device, wherein the last compatible version is compatible with the operating system of the second device associated with the user.

12. A non-transitory computer readable medium storing instructions thereon that, when executed by at least one processor causes one or more servers to:
detect a customized application configuration for an application installed on a first device utilized by a user, the customized application configuration reflecting one or more selections, with regard to available configurations related to the application, implemented for the application installed on the first device;
generate an application configuration data package comprising the customized application configuration reflecting the one or more selections implemented for the application installed on the first device, the application configuration data package configured to cause installation of the application with the customized application configuration;
in response to receiving, by the one or more servers, a request for the application from a second device associated with the user of the first device, provide, from the one or more servers, for display and selection by the second device associated with the user of the first device, the application configuration data package comprising the customized application configuration reflecting the one or more selections by the user of the first device; and
based on receiving, by the one or more servers, a selection of the application configuration data package from the second device associated with the user of the first device, provide the application configuration data package to the second device such that upon installation of the application configuration data by the second device the application will be installed on the second device with the customized application configuration of the application installed on the first device, wherein the application configuration data package causes installation of the application on the second device with a same configuration as the application installed on the first device.

13. The computer readable medium of claim 12, further comprising instructions that, when executed by the at least one processor, cause the one or more servers to:
  store application configuration data corresponding to the customized application configuration for the application installed on the first device; and
  update the application configuration data corresponding to the customized application configuration for the application on the first device when updates are made to the application on the first device.

14. The computer readable medium of claim 13, further comprising instructions that, when executed by the at least one processor, cause the one or more servers to associate the stored application configuration data with a user profile.

15. The computer readable medium of claim 14, wherein the application configuration data comprises configuration data for each of one or more devices associated with the user profile, and wherein the application configuration data package is customized to include settings based on parameters stored in the application configuration data.

16. The computer readable medium of claim 12, wherein the instructions, when executed by the at least one processor, further cause the one or more servers to:
  determine that the second device associated with the user of the first device utilizes a second operating system different from a first operating system utilized by the first device; and
  configure the application configuration data package to cause installation of the application with the customized application configuration on the second device with the second operating system.

17. The computer readable medium of claim 12, wherein the instructions, when executed by the at least one processor, cause the one or more servers to provide, from the one or more servers, for display and selection by the second device associated with the user of the first device, the application configuration data package comprising the customized application configuration by:
  providing from the one or more servers, for selection and display by the second device associated with the user of the first device, a plurality of application configuration data packages, wherein the plurality of application configuration data packages comprises at least one application configuration data package based on the application configuration data and at least one application configuration data package not based on the application configuration data.

18. The computer readable medium of claim 12, wherein the instructions, when executed by the at least one processor, further cause the one or more servers to:
  determine that the second device associated with the user of the first device utilizes a second operating system different from a first operating system utilized by the first device;
  determine that a portion of the customized application configuration is not compatible with the second operating system; and
  generate the application configuration data package comprising a last compatible version of the portion of the customized application configuration that is not compatible with the second operating system, wherein the last compatible version is compatible with the second operating system of the second device associated with the user.

* * * * *